United States Patent
Wrobel (10) Patent No.: US 8,246,279 B2
(45) Date of Patent: Aug. 21, 2012

(54) TIGHT-SPACE DRILLING PRODUCT

(76) Inventor: Robert B. Wrobel, Norwood Park, IL (US)

(*) Notice: Subject to any disclaimer, the term of this patent is extended or adjusted under 35 U.S.C. 154(b) by 616 days.

(21) Appl. No.: 12/462,870

(22) Filed: Aug. 11, 2009

(65) Prior Publication Data

US 2010/0047027 A1    Feb. 25, 2010

Related U.S. Application Data

(60) Provisional application No. 61/090,486, filed on Aug. 20, 2008.

(51) Int. Cl.
*B23B 47/04* (2006.01)
*B23B 47/18* (2006.01)

(52) U.S. Cl. .......... 408/79; 408/101; 408/110; 408/138; 408/141

(58) Field of Classification Search .......... 408/17, 408/24, 31, 35, 54, 72 R, 79, 87, 95, 97, 101, 408/110–112, 137, 138, 141
See application file for complete search history.

(56) References Cited

U.S. PATENT DOCUMENTS

| | | | | |
|---|---|---|---|---|
| 292,345 A | * | 1/1884 | Moritz | 408/121 |
| 525,385 A | * | 9/1894 | Feely | 408/79 |
| 788,888 A | * | 5/1905 | Cross | 408/79 |
| 825,791 A | * | 7/1906 | Young | 408/110 |
| 836,212 A | * | 11/1906 | Pierce et al. | 408/114 |
| 960,097 A | * | 5/1910 | Keithley et al. | 408/79 |
| 1,127,011 A | * | 2/1915 | Kafader | 166/55.3 |
| 2,140,854 A | * | 12/1938 | Schnebly | 408/72 R |
| 2,617,455 A | | 11/1952 | Kuta | |
| 3,006,223 A | | 10/1961 | Broussard | |
| 3,512,434 A | * | 5/1970 | Juhasz et al. | 408/14 |
| 4,184,795 A | | 1/1980 | Medlin | |
| 4,403,892 A | | 9/1983 | Kane | |
| 4,419,032 A | | 12/1983 | Flowers | |
| 4,669,929 A | | 6/1987 | Olesen | |
| 5,017,057 A | | 5/1991 | Kryger | |
| 5,238,338 A | * | 8/1993 | Stucky | 409/143 |
| 5,352,070 A | * | 10/1994 | Tehrani | 408/102 |
| 5,395,188 A | | 3/1995 | Bowling | |
| 5,527,169 A | * | 6/1996 | Goldenberg et al. | 425/11 |
| 6,261,033 B1 | * | 7/2001 | Thames et al. | 408/1 R |

* cited by examiner

*Primary Examiner* — Daniel Howell
(74) *Attorney, Agent, or Firm* — David J. Bremer (57) ABSTRACT

A tight-space drilling product for drilling in a confined space between a workpiece and an opposite surface includes a drilling implement with a confined space configuration where the drilling implement contacts both the workpiece and the opposite surface.

19 Claims, 12 Drawing Sheets

TIGHT-SPACE DRILLING PRODUCT

This application claims the benefit of prior U.S. Provisional Application No. 61/090,486, filed on 20 Aug. 2008.

The invention relates to drilling products for drilling in confined spaces, and specifically relates to drilling products for drilling through a perimeter wall header where perimeter wall intersects a sloping roof.

The invention is useful when adding electrical outlets in existing perimeter walls. By drilling down through the perimeter wall header, electric wires can be run through conduit above the ceiling towards the perimeter walls then down through holes drilled by the drilling product through the wall headers so that the wire can be threaded behind wall sheathing to connect to an added electrical outlet. The drilling product enables drilling in the confined space where a sloped roof meets a perimeter wall and where the height of conventional drills can preclude drilling sufficiently near the perimeter wall. The drilling product can be utilized in various locations, including various confined spaces and unconfined spaces, and for various drilling operations performed on various workpieces.

There exist tools for drilling through wall headers of perimeter walls that utilize drills of various designs. Right-angle drills are known in the art for drilling perpendicularly between floor joists and roof rafters and in other confined spaces. Specialty tools for the abovementioned applications are also known in the art.

Right-angle electric-powered drills are designed for use in some confined spaces, however the minimum space required for operating right-angle drills is increased by the chuck that grips the drill bit, as well as the gear assembly necessary to convert rotation about a motor axis to rotation about a drill bit axis where the drill bit axis is non-parallel to the motor axis.

Various types of universal joints are known be utilized with conventional drills to convert rotation about one axis to rotation about another non-parallel axis, however the joint itself requires some space. In addition, universal joints are effective for some oblique angles but can have difficulty negotiating a right angle. Also, a universal joint requires some kind of chuck for gripping the drill bit, which would occupy some space and further increase the minimum space required for operation.

It is evident that a better solution for drilling in confined spaces is needed.

SUMMARY OF THE INVENTION

In one embodiment, the invention is a tight-space drilling product comprising a drilling implement in use positioned in a confined space between a workpiece and an overhanging opposite surface, where the drilling implement has a confined drilling configuration, where the drilling implement in the confined drilling configuration drills into the workpiece, where the drilling implement comprises a cutting end, a distal tail end, and a shank connecting the cutting end and the tail end, where the drilling implement further comprises a drill axis extending substantially centrally through the shank and through the cutting end and the tail end, where the cutting end in the confined drilling configuration contacts the workpiece, where the tail end in the confined drilling configuration contacts the opposite surface, where the drilling implement drills by rotating about the drill axis while translating along the drill axis towards the workpiece, where the drilling product further comprises a drive assembly operatively engaging the drilling implement between the cutting end and the tail end, and where the drive assembly in use causes the drilling implement to rotate about the drill axis and synchronously causes the drilling implement to translate along the drill axis.

In another embodiment, the tight-space drilling product comprises a drilling implement capable of drilling orthogonally into a workpiece from a confined drilling position between the workpiece and an overhanging opposite surface, where the drilling implement has a cutting end, a distal tail end, and a shank connecting the cutting end and the tail end, where the drilling implement has a drill axis extending substantially centrally through the shank between the cutting end and the tail end, where the cutting end in the confined drilling position contacts the workpiece, where the tail end in the confined drilling position can contact the opposite surface, where the drilling implement drills by rotating about the drill axis while translating along the drill axis towards the workpiece, where the drilling product further comprises a drive assembly connected to the drilling implement, where the drive assembly operatively engages the drilling implement between the cutting end and the tail end, and where the drive assembly in use causes the drilling implement to rotate about the drill axis and causes drilling implement to translate along the drill axis.

In yet another embodiment, the tight-space drilling product comprises a drilling implement having a confined drilling configuration between a workpiece and an overhanging opposite surface, the drilling implement comprising a cutting end, a tail end, and a shank separating the cutting end and the tail end, the cutting end in the confined drilling configuration contacting the workpiece, the tail end in the confined drilling configuration contacting the opposite surface, the drilling implement having a drill axis extending along the shank and passing through the cutting end and the tail end, the drilling implement in use rotating about the drill axis and translating along the drill axis, the shank having external threads extending along the drill axis between the cutting end and the tail end, the shank having an elongate groove interrupting at least some of the external threads along the drill axis between the cutting end and the tail end, the shank having an unthreaded portion medial the threads and the tail end, the drilling product further comprising a drive assembly operatively engaging the drilling implement between the cutting end and the tail end, the drive assembly in use causing the drilling implement to rotate about the drilling axis and causing the bit to translate along the drilling axis, the drive assembly comprising a frame comprising a drive side, a workpiece side, and an opposite side, the drilling implement in use extending beyond the workpiece side away from the opposite side and extending beyond the opposite side away from the workpiece side, the drive assembly further comprising a translation gear rotatably connected to the frame, the translation gear having a threaded bore, the translation gear in use threadedly engaging the external threads via the threaded bore, the drive assembly further comprising a rotation gear rotatably mounted to the frame, the rotation gear having a clearance bore with a pin extending radially into the clearance bore, the rotation gear in use co-rotating with the drilling implement via the pin engaging the elongate groove, the drive assembly further comprising a drive gear in use rotating about a drive axis, the drive gear in use operatively engaging the threaded gear and the rotation gear and causing the threaded gear and the rotation gear to counter-rotate with respect to each other, the rotating drive gear causing drilling implement rotation via the rotation gear and causing drilling implement translation via the threaded gear, and the drilling implement further comprising a return component acting between the drilling implement and the drive assembly, the return component pressing at least one external thread against the threaded bore when the unthreaded portion is within the threaded bore.

DETAILED DESCRIPTION OF THE INVENTION

The tight-space drilling product can drill into a workpiece, for example a wall header and a ceiling, from a confined space between the workpiece and an opposite surface, for example roof decking.

Figure 1:
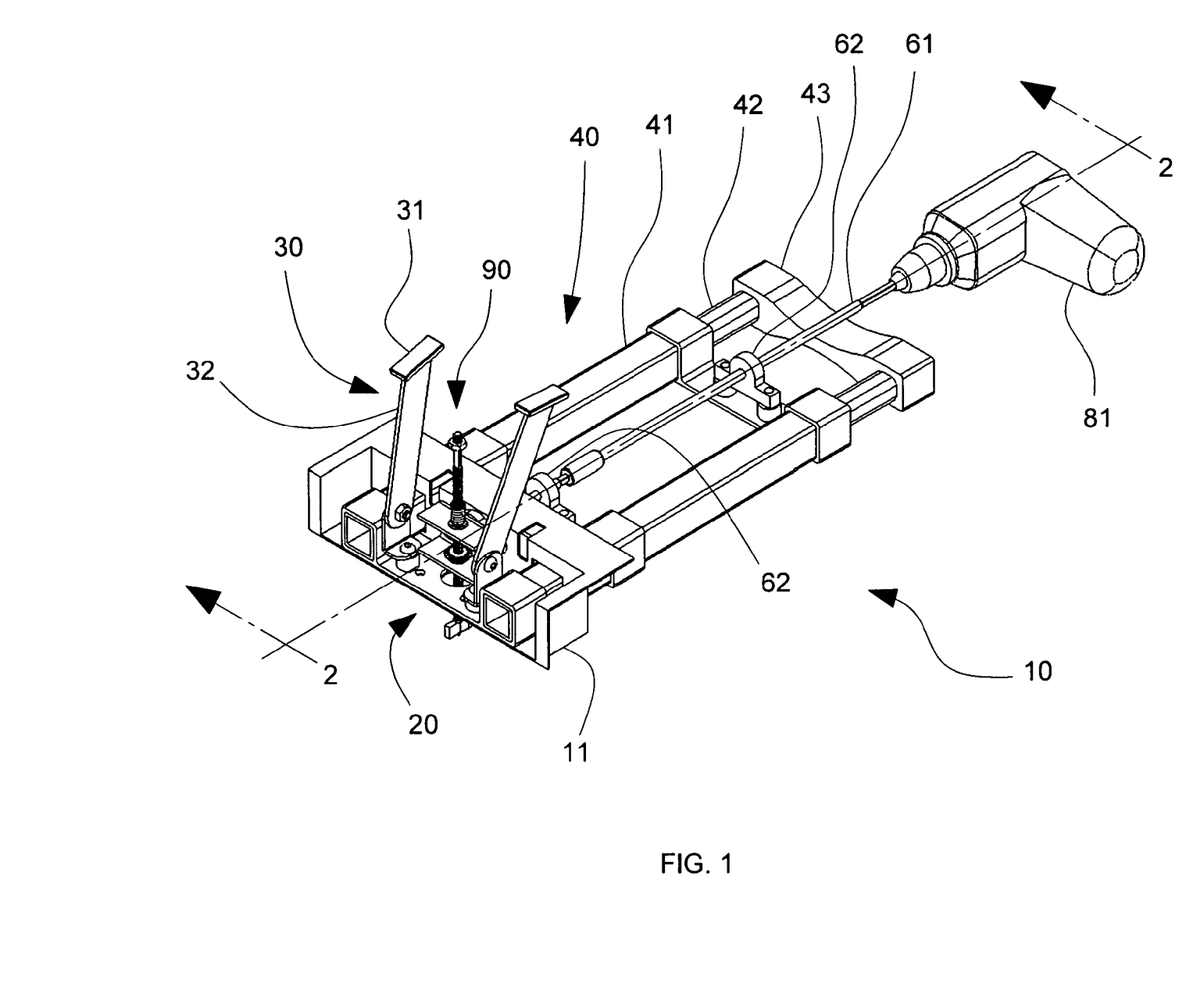
FIG. 1 is an isometric view of an embodiment of the invention.
Figures 11, 12:
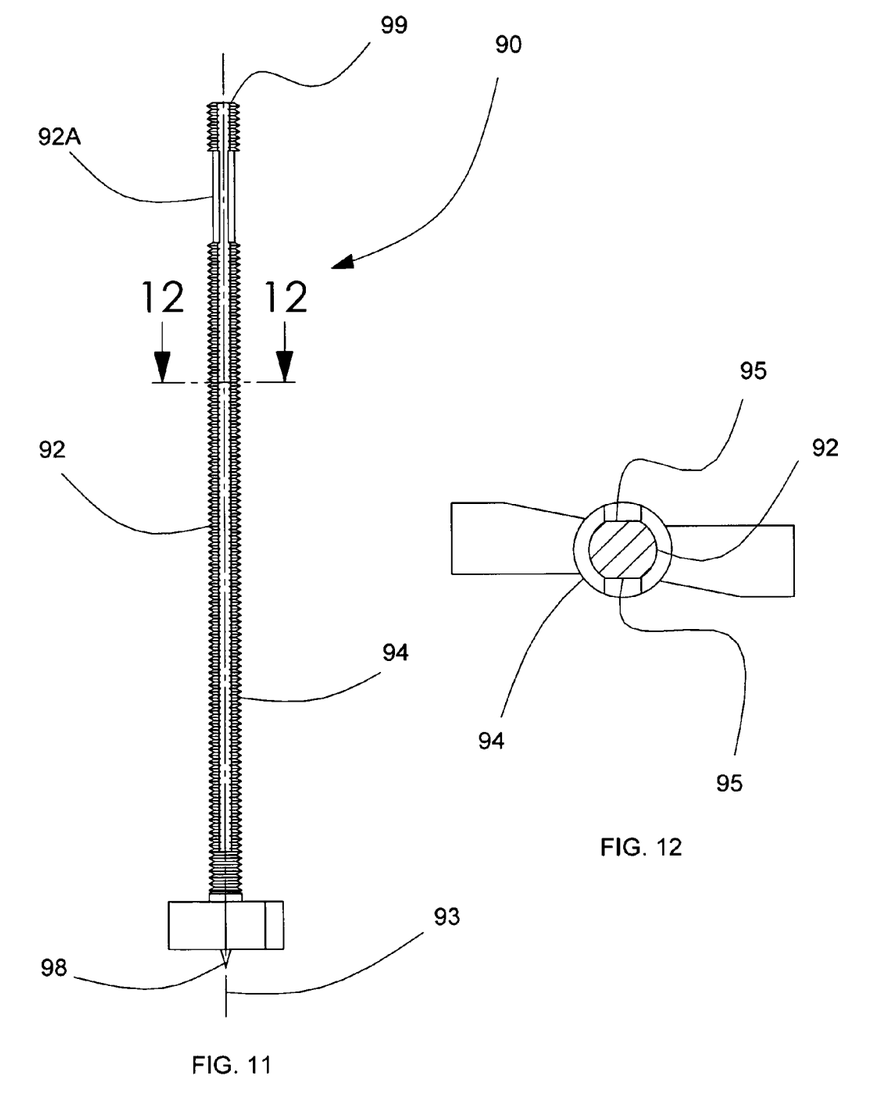
FIG. 11 is a side view of an embodiment of a drilling implement.
FIG. 12 is a top section view across line 12-12.

As seen in FIGS. 1, 11, and 12, the tight-space drilling product 10 can comprise a drilling implement 90. The drilling implement 90 can have a cutting end 98, a distal tail end 99, and a shank 92 connecting the cutting end 98 and the tail end 99. The drilling implement 90 can have a drill axis 93 extending substantially centrally through the shank 92 and through the cutting end 98 and the tail end 99. The drilling implement 90 can have a drill length substantially equal to a distance between the cutting end 98 and the tail end 99.

The drilling implement drills by rotating about the drill axis 93 while translating along the drill axis 93 towards the workpiece. The drilling implement can be a drill bit, for example a twist drill, a spade drill, a trepan drill, and various other conventional drill bits and specially-designed drilling implements and combinations thereof, so long as the drilling implement drills by rotating about the drill axis 93 while translating along the drill axis 93 towards the workpiece. The drilling implement can have various components including, but not limited to, the aforementioned drill bit.

The drilling implement 90 can further comprise external threads 94 residing along the shank 92 and extending along the shank 92 coaxially to the drill axis 93. Additionally, the drilling implement 90 can have an elongate groove 95 extending along the shank 92 parallel to the drill axis 93 and interrupting at least some of the external threads 94 along the shank 92. The drilling implement can have more than one elongate groove and the grooves can be positioned along the shank at different angular positions about the drill axis 93.

Figure 2:
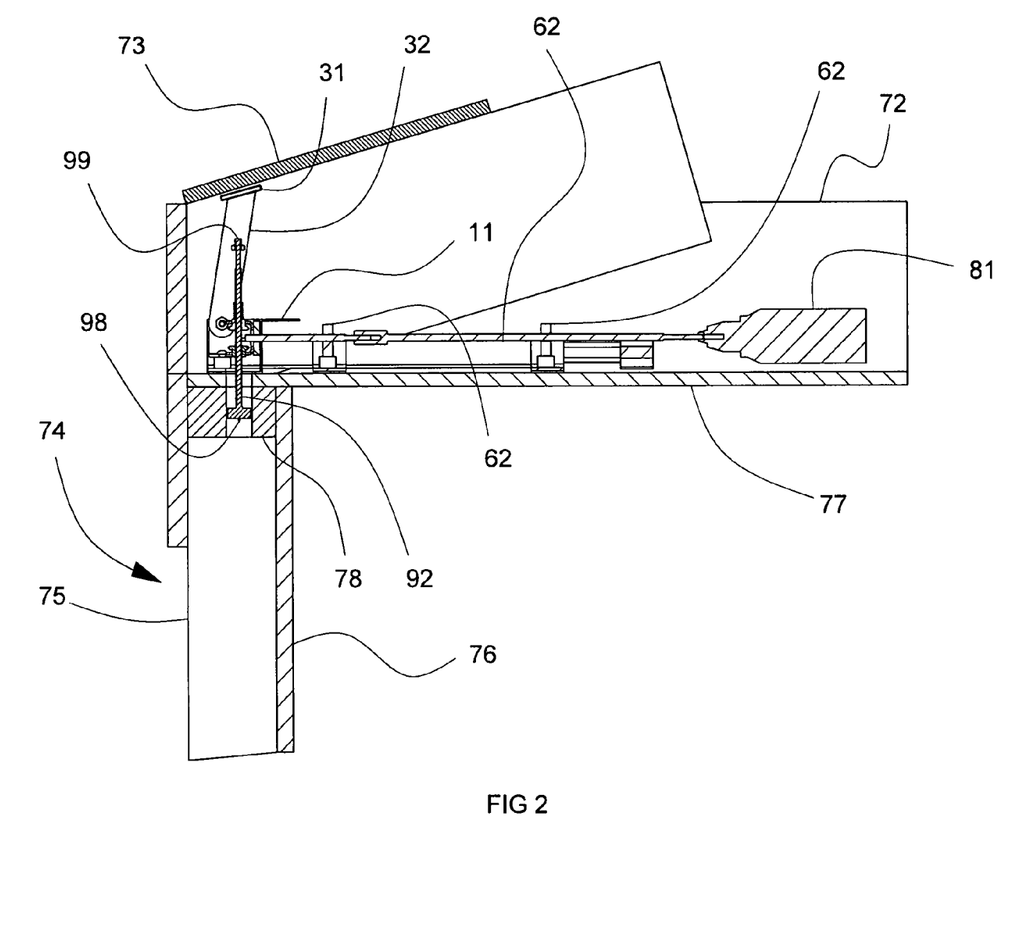
FIG. 2 is a side section view across line 2-2 with building environment components added.
Figure 3:
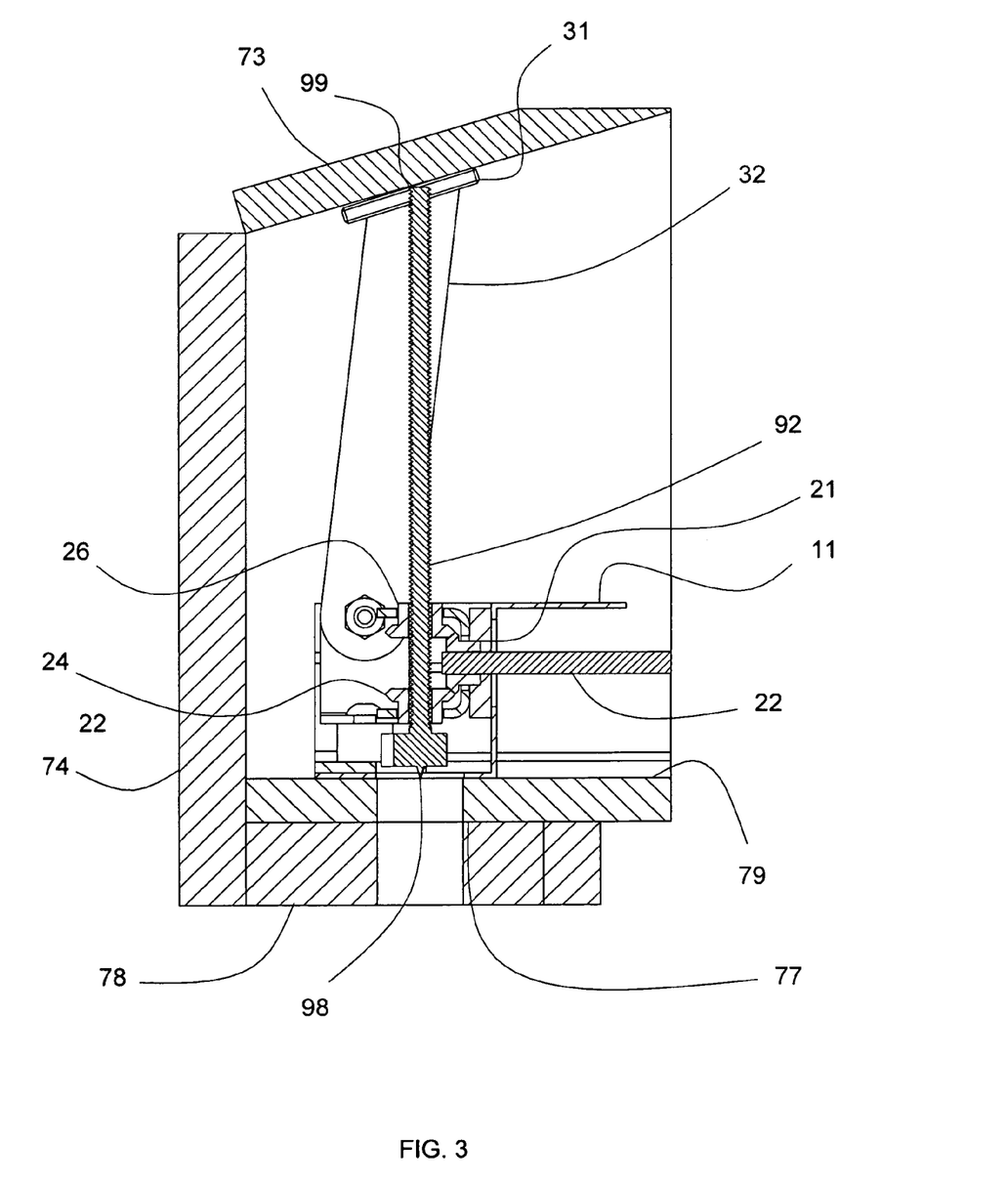
FIG. 3 is a side section view, similar to FIG. 2, of another embodiment of the invention shown with the drilling implement in the confined configuration.

As shown in FIGS. 2 and 3, in use the drilling implement 90 can be positioned in the confined space between the workpiece and the overhanging opposite surface. The drilling implement 90 can have a confined drilling configuration for drilling from a minimal space between the workpiece and the opposite surface. In the confined drilling configuration, the cutting end 98 of the drilling implement 90 can contact the workpiece at a drilled surface and the tail end 99 of the drilling implement 90 can contact the opposite surface. In the confined drilling configuration, the drilling product can drill into the workpiece at a location where the workpiece and the overhanging opposite surface are spaced apart by the drill length.

For example, when using the drilling product to drill into a perimeter wall header near an intersection of the perimeter wall and a sloping roof, the space available for positioning the drilling product between the wall header and the roof decking diminishes as the drilling product approaches the intersection. The confined drilling configuration facilitates drilling from the minimal confined space. In the confined drilling configuration, the drilling product can be advanced toward the intersection until the cutting end 98 contacts a wall header 78 and the tail end 99 contacts a roof decking 73.

The drilling implement 90 can have an unconfined drilling configuration for drilling from a larger space between the workpiece and the opposite surface. In the unconfined drilling configuration, the cutting end 98 of the drilling implement 90 can contact the workpiece at a drilled surface and the tail end 99 of the drilling implement 90 can be proximal the opposite surface. In the unconfined drilling configuration, the drilling product can drill into the workpiece at a location where the workpiece and the overhanging opposite surface are spaced apart by more than the drill length.

The drilling product can drill into the workpiece at various angles, including orthogonally with respect to the drilled surface, with the drilling implement in either the confined drilling configuration or the unconfined drilling configuration.

The drilling implement 90 can drill into the workpiece by rotating and translating towards the workpiece and can retract from the workpiece by translating away from the workpiece.

Figure 4:
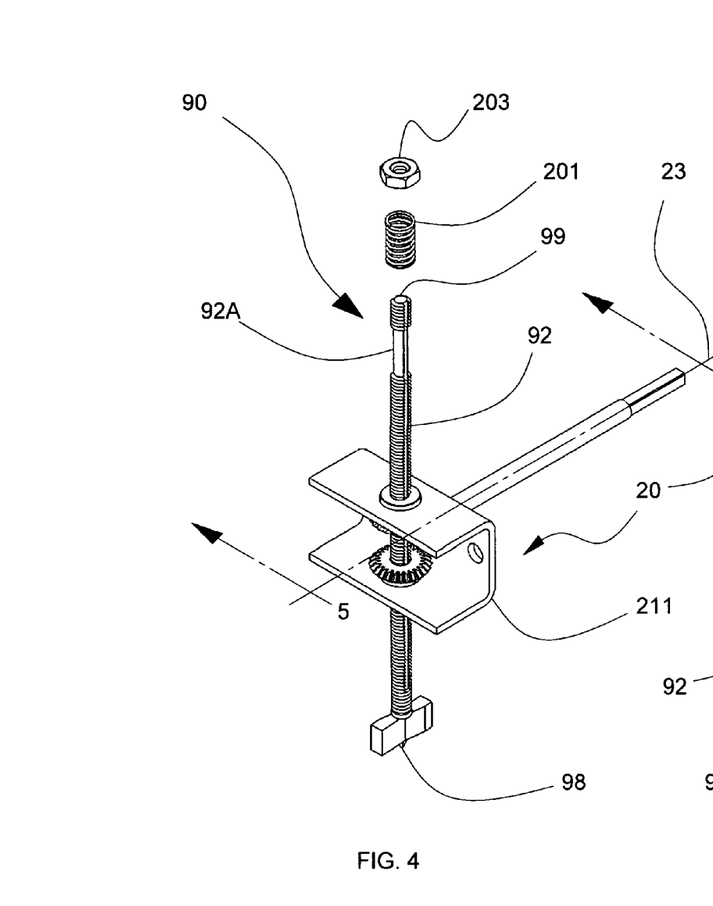
FIG. 4 is an isometric exploded view of an embodiment of a drive assembly and a drilling implement.
Figure 5:
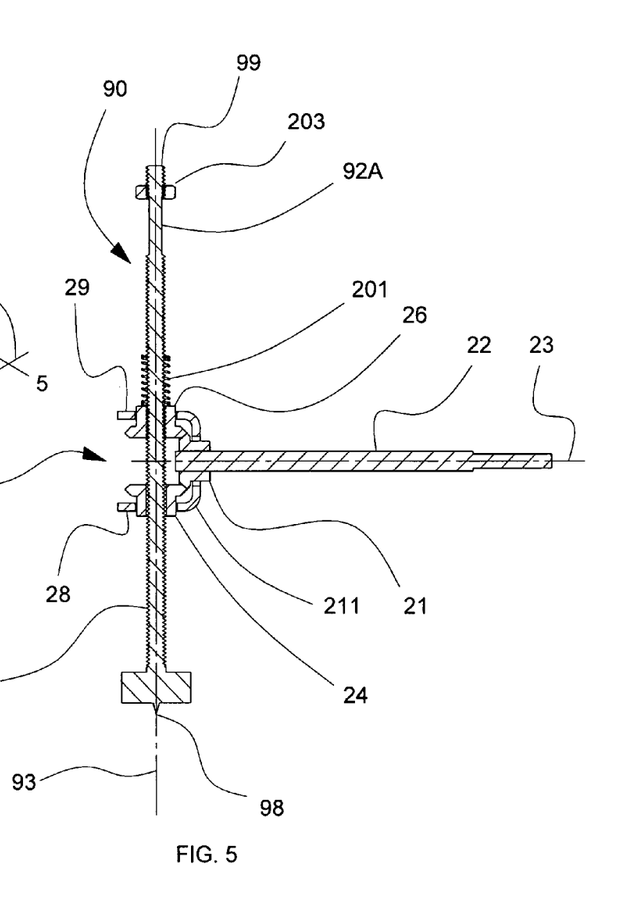
FIG. 5 is an unexploded side section view across line 5-5.
Figure 6:
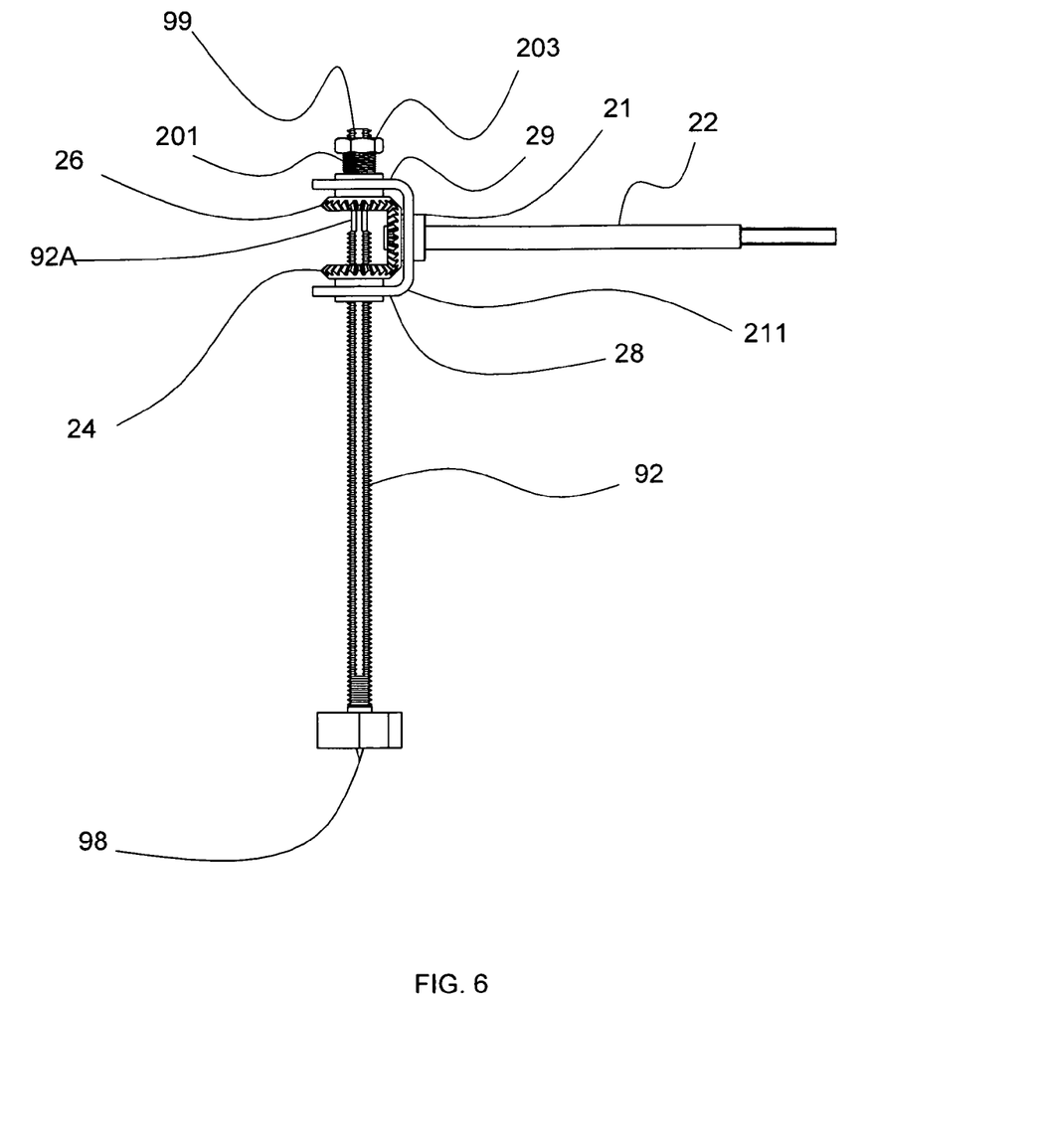
FIG. 6 is side view of the embodiment of the drive assembly and the drilling implement.
Figure 7:
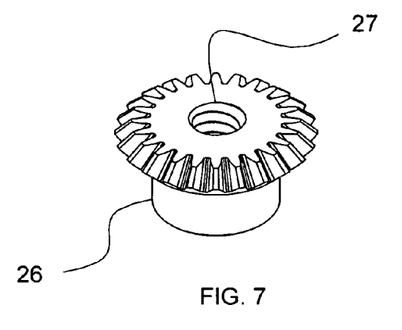
FIG. 7 is an isometric view of a translation gear.
Figure 8:
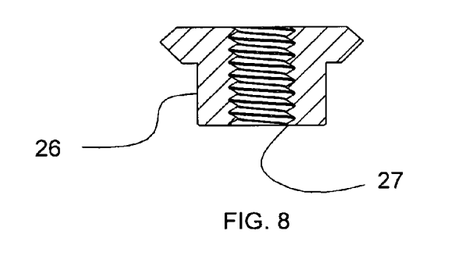
FIG. 8 is a side section view of the translation gear of FIG. 7.

As shown in FIGS. 4, 5, and 6, the drilling product 10 can further comprise a drive assembly 20. The drive assembly 20 can operatively engage the drilling implement 90 and cause the drilling implement 90 to drill into the workpiece.

The drive assembly 20 can operatively engage the drilling implement 90 between the cutting end 98 and the tail end 99 to cause the drilling implement 90 to rotate about the drill axis 93 and to cause drilling implement 90 to translate along the drill axis 93. The drive assembly 20 can cause the drilling implement 90 to rotate and translate toward the workpiece, and the drive assembly 20 can cause the drilling implement 90 to rotate reversely and translate toward the opposite surface.

The drive assembly can comprise an energy source that provides energy for causing the drilling implement to drill the workpiece. The energy source can comprise an electric motor, manual power provided by a user via mechanical linkage, and various other energy sources and combinations thereof.

In some embodiments, the energy source can be an electric hand drill that connects to the drive assembly via mechanical linkage. Alternatively, the energy source can be a special use electric motor configured particularly for use with the drilling product.

The drive assembly 20 can comprise a workpiece side 28 and an opposite side 29. In use, the workpiece side 28 can be positioned proximal the workpiece, and the opposite side 29 can be positioned proximal the opposite surface.

In use, the drilling implement 90 can move between extending beyond the workpiece side 28 towards the workpiece and extending beyond the opposite side 29 toward the opposite surface.

The drilling product 10 can comprise a translation stop for stopping the drilling implement 90 from translating along the drill axis 93 while the drilling implement 90 is rotating about the drill axis 93. It can be useful for the drilling implement 90 to stop translating at a predetermined position along the drill axis 93, for example when the workpiece has been sufficiently drilled.

The translation stop can be an unthreaded portion 92A of the drilling implement shank 92. The unthreaded portion 92A can be positioned at various positions along the shank. When the unthreaded portion 92A wholly occupies the threaded bore, so that the external threads 94 do not engage the threaded bore, the drilling implement 90 can stop translating while continuing to rotate.

Alternatively, the translation stop can be a limit switch that discontinues the energy from the energy source when the drilling implement approaches a predetermined position. The translation stop can be a stop indicator, such as a visual indicator and an audible indicator that signals a user to discontinue energy from the energy source. The translation stop can be various mechanical, electrical, and indicator stops and combinations thereof. The drilling product 10 can comprise more than one translation stop.

It can be useful for the drilling implement 90 to stop translating when the tail end 99 of the drilling implement 90 approaches the opposite side 29 of the drive assembly 20. It can be useful for the drilling implement 90 to stop translating when the cutting end 98 approaches the workpiece side 28. There can be various other positions and situations where it can be useful for the drilling implement to stop translating.

As shown in FIGS. 7, 8, 9, and 10, the drive assembly 20 can comprise a translation gear 26 having a threaded bore 27. The translation gear 26 can engage the external threads 94 along the drilling implement 90 via the threaded bore 27 so that counter-rotating the drilling implement 90 with respect to the translation gear 26 causes relative translation along the drilling axis 93 between the translation gear 26 and the drilling implement 90.

Additionally, the drive assembly 20 can comprise a rotation gear 24 having a clearance bore 25, where the clearance bore 25 is sized to enable the drilling implement shank 92 to translate slidingly through the clearance bore 25 along the drill axis 93.

Figure 9:
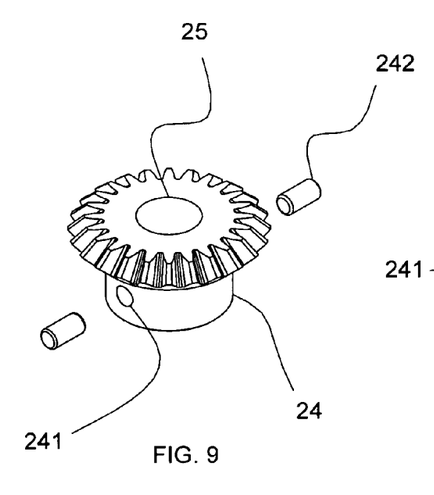
FIG. 9 is an exploded isometric view of a rotation gear with a pin.
Figure 10:
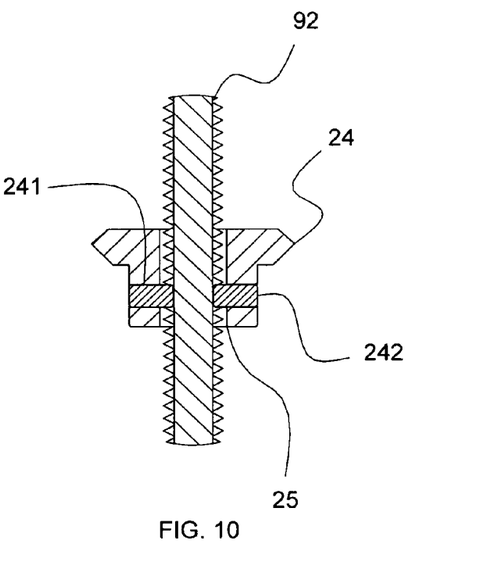
FIG. 10 is an unexploded side section view of the rotation gear and the pin of FIG. 9 including a drilling implement positioned in the rotation gear.

The rotation gear 24 can have a projection extending radially into the clearance bore 25. The clearance bore 25 and the projection can be configured so that the drilling implement 90 can slide through the clearance bore 25 along the drill axis 93 with the projection extending into the elongate groove 95 on the shank 92. The projection engaging with elongate groove 95 can cause the rotation gear 24 and the drilling implement 90 to co-rotate with each other. With the drilling implement 90 positioned in the clearance bore 25 and with the projection extending into the elongate groove 95, the drilling implement 90 can translate along the drill axis 93 with respect to the rotation gear 24 while co-rotating with the rotation gear 24.

In one embodiment, the projection can be a pin 242 positioned within a pin hole 241 and extending radially through the rotation gear 24. The pin 242 can extend beyond the pin hole 241 into the clearance bore 25 to engage the elongate groove 95 on the shank 92. The pin 242, positioned within the pin hole 241 and extending radially into the clearance bore 25 to engage the elongate groove 95 can cause the drilling implement 90 to rotate with the rotation gear 24. By sliding along the elongate groove 95, the pin 242 can cause drilling implement rotation and enable synchronous drilling implement translation.

In another embodiment, the projection can comprise a key positioned in a keyseat, an integral projection machined from rotation gear material, and various types of projections so long as the projection extends into the clearance bore.

The rotation gear 24 can comprise more than one projection and the projections can correspond to elongate grooves positioned along the shank at different angular positions about the drill axis 93.

As shown in FIGS. 4, 5, and 6, the translation gear 26 and the rotation gear 24 can be positioned with the respective bores coaxially aligned with each other and with the drill axis 93.

Additionally, the drive assembly 20 can comprise a drive gear 21. The drive gear 21 can operatively engage the translation gear 26 and the rotation gear 24 simultaneously so that rotating the drive gear 21 causes the translation gear 26 and the rotation gear 24 to counter-rotate with respect to each other. The drive gear 21, in use, can cause substantially synchronized drilling implement rotation via the rotation gear 24 and drilling implement translation via the translation gear 26.

The drive gear 21 in use can rotate about a drive axis 23. The drive axis can be non-parallel to the drill axis 93. The drive axis can be positioned at an oblique angle with respect to the drill axis 93. The drive axis can be perpendicular to the drill axis 93.

The drive assembly 20 can further comprise a frame 211. The frame 211 can comprise the workpiece side 28 and the opposite side 29 as well as a drive side. The frame 211 can be U-shaped with the workpiece side 28 and the opposite side 29 forming substantially parallel legs of the U-shape and with the drive side connecting and substantially perpendicular to both the workpiece side 28 and the opposite side 29. The drilling implement 90 can extend beyond the workpiece side 28 and the opposite side 29, respectively, as the drilling implement 90 translates towards the workpiece and translates away from the workpiece.

The drive assembly 20 can further comprise a drive shaft 22 connected to the drive shaft 21. The drive shaft 22 can link the drive gear 21 to the energy source to facilitate the energy source providing energy to cause the drilling implement 90 to drill the workpiece. The energy source can cause the drive shaft 22 to rotate thereby causing the drive gear 21 to rotate.

The frame 211 can be utilized to position the translation gear 26, the rotation gear 24, and the drive gear 21, to facilitate drilling with the drilling implement 90. In an embodiment having the frame 211, the rotation gear 24 can be mounted for rotation on the workpiece side 28. The translation gear 26 can be mounted for rotation on the opposite side 29. The translation gear 26 and the rotation gear 24 can be positioned with the threaded bore 27 and the clearance bore 25 coaxially aligned with each other. In the embodiment having the frame 211, the drilling implement 90 can be positioned so that the drill axis 93 is coaxial to the threaded bore 27 and to the clearance bore 25, with the external threads 94 engaged with the threaded bore 27 and with the shank 92 extending through the clearance bore 25 with the projection engaged with the elongate groove 95.

The drive gear 21 can be mounted for rotation on the drive side and positioned so that the drive gear 21 engages both the translation gear 26 and the rotation gear 24. When the drive gear 21 rotates, the drive gear 21 can cause the translation gear 26 and the rotation gear 24 to counter-rotate simultaneously with respect to each other.

In some embodiments, the drilling implement 90 can further comprise a return component. The return component can facilitate the drilling implement external threads 94 reengaging with the translation gear threaded bore 27 when the unthreaded portion 92A is in the threaded bore 27.

In use, the drilling implement 90 can translate along the drill axis 93 until the external threads 94 pass through and out of the threaded bore 27 and disengage from the threaded bore 27, and the unthreaded portion 92A is within the threaded bore 27. When the threads disengage from the threaded bore 27, the drilling implement 90 can stop translating although the rotation gear 24 can still cause the drilling implement 90 to rotate.

The return component can act between the drilling implement 90 and the drive assembly 20 to press at least one of the external threads 94 against the threaded bore 27 when the unthreaded portion 92A is within the threaded bore 27. Pressing the external thread against the threaded bore 27 enables the external thread to engage again with the threaded bore 27 when the drilling implement 90 is caused to rotate reversely.

The return component can comprise a biasing element 201 that presses the at least one external thread against the threaded bore 27 when the unthreaded portion 92A is within the threaded bore 27. The biasing element 201 can be a coil spring, such as a compression spring. The biasing element can comprise a wave spring and can comprise a Belleville washer. The biasing element can comprise an air spring. The biasing element can comprise magnetic material and can comprise an electromagnet and combinations thereof. The biasing element can comprise resilient material such as nylon, rubber, steel, brass, and various synthetic and natural resilient materials and combinations thereof.

In one embodiment, the return component can comprise a compression spring positioned coaxially around the drilling implement 90. The return component can further comprise a retainer 203 fixed to the drilling implement 90 proximal the tail end 99, where the retainer 203 is sized to prevent the spring from moving past the tail end 99. The retainer 203 can be a nut threaded to the end of the drilling implement 90. Alternatively, the retainer can be a washer. Alternatively, the retainer can be a cotter pin and can be various other retainers fixed to the drilling implement 90 so that they prevent the spring from moving past the tail end 99.

In use, as the drilling implement 90 translates towards the workpiece and the external threads 94 pass through and out of the threaded bore 27, the spring can be compressed between the drive assembly opposite side 29 and the washer 205. The compressed spring acts to bias the drilling implement 90 away from the workpiece and presses the at least one external thread against the threaded bore 27. When the rotation gear 24 rotates reversely, the rotation gear 24 causes the drilling implement 90 to rotate reversely so that the external thread re-engages with the threaded bore 27 and the drilling implement 90 translates away from the workpiece.

As shown in FIGS. 1, 2, and 3, the drilling product 10 can further comprise a brace 30. The brace 30 can limit drilling product movement away from the workpiece while drilling the workpiece. The brace 30 can connect to the foundation 11 and can contact the opposite surface so that the brace 30 can be squeezed between the foundation 11 and the opposite surface. The drilling product 10 can comprise more than one brace 30.

The brace can be adjustable to accommodate various distances between the foundation 11 and the opposite surface. The brace 30 can be adjustable by pivoting. The brace can be adjustable by telescoping. The brace can be adjustable via various adjusting modes including pivoting, telescoping, and combinations thereof.

One embodiment of the drilling product 10 has a brace 30 that has a leg 32 pivotally connected to a base, where the base is connected to the foundation 11. The leg 32 can have a pad 31 distal the base and the leg 32 can pivot to bring the pad 31 into contact with the opposite surface. The brace can have more than one leg. The leg can have more than one pad.

The pad 31 can be pivotally connected to the leg 32. The pad 31 can comprise material with friction characteristics that minimize slipping between the pad 31 and the opposite surface.

The drilling product 10 can have an extender 40 that facilitates positioning the drilling product 10 proximal the perimeter wall. The extender 40 can be adjustable to enable positioning the drilling product 10 from various locations distal the perimeter wall. For example, the extender 40 can enable a user to position the drilling product 10 proximal the perimeter while the user is at a distance from the perimeter wall. Similarly, the extender 40 can enable positioning when an obstacle such as an air duct obstructs access to space proximal the perimeter wall.

In one embodiment, the extender 40 can comprise an outer tube 41 and an inner tube 42, where the inner tube 42 slides telescopically within the outer tube 41. The inner tube 42 can be fixable at various positions within the outer tube 41 so that the inner tube 42 protrudes from the outer tube 41.

The inner tube 42 can have a handle 43 connected to the inner tube 42 outside of the outer tube 41. Sliding the inner tube 42 along the outer tube 41 can position the handle 43 at various positions distal the drilling implement. The handle can be locked at various positions along the outer tube 41.

The drilling product can have a drive shaft extension 61. The drive shaft extension 61 can facilitate using a power drill as an energy supply when the extender is needed to position the drilling product. When the extender is configured with the handle 43 distal the drilling implement 90, the drive shaft extension 61 can connect to the drive shaft 22 and also connect to a power drill 81 positioned distal the drilling implement 90.

The drive shaft and the drive shaft extension 61 can be supported by bearings, for example the bearing 62 mounted proximal the foundation 11, and the bearing 62 mounted distal the drilling implement 90. The bearing 62 can position the drive shaft 22 and the drive shaft extension 61 coaxially with the drive axis 23 while enabling the drive shaft 22 and the drive shaft extension 61 to rotate about the drive axis 23.

Figure 13:
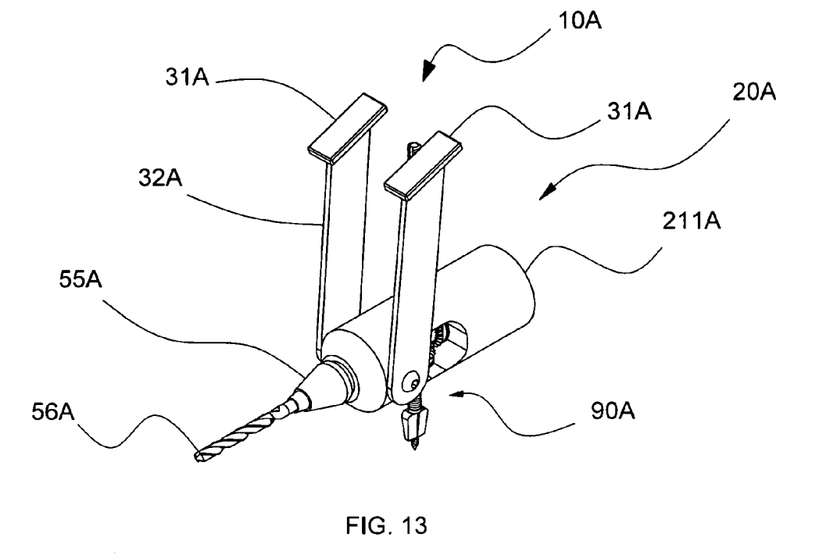
FIG. 13 is an isometric view of an embodiment of the invention.

Another embodiment of the product is shown in FIG. 13. The product 10A can be mounted directly to a cordless power drill and to other power drills.

Figure 14:
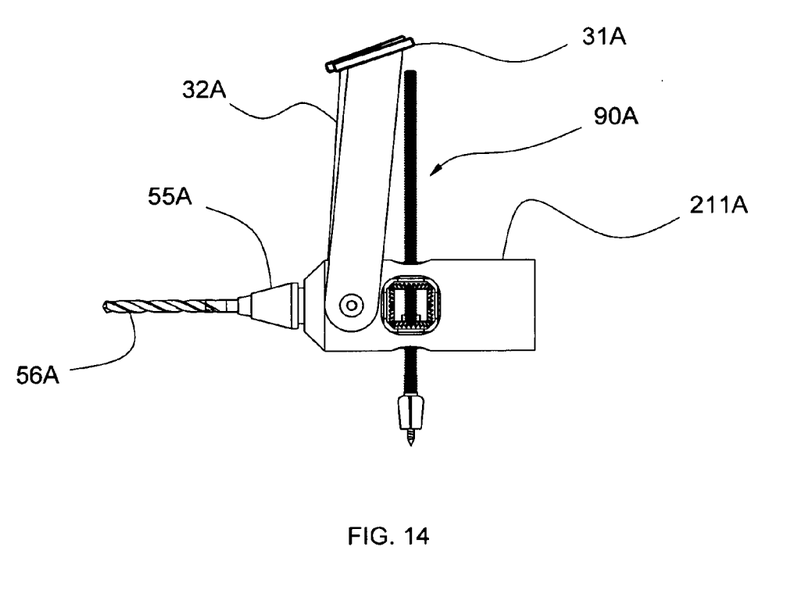
FIG. 14 is a side view of the embodiment of FIG. 13.

As shown in FIGS. 13 and 14, the product 10A can comprise a drive assembly 20A. The drive assembly 20A can operatively engage a drilling implement 90A and cause the drilling implement to drill into the workpiece. The drive assembly can comprise a modified frame 211A for positioning various functional components.

Figure 15:
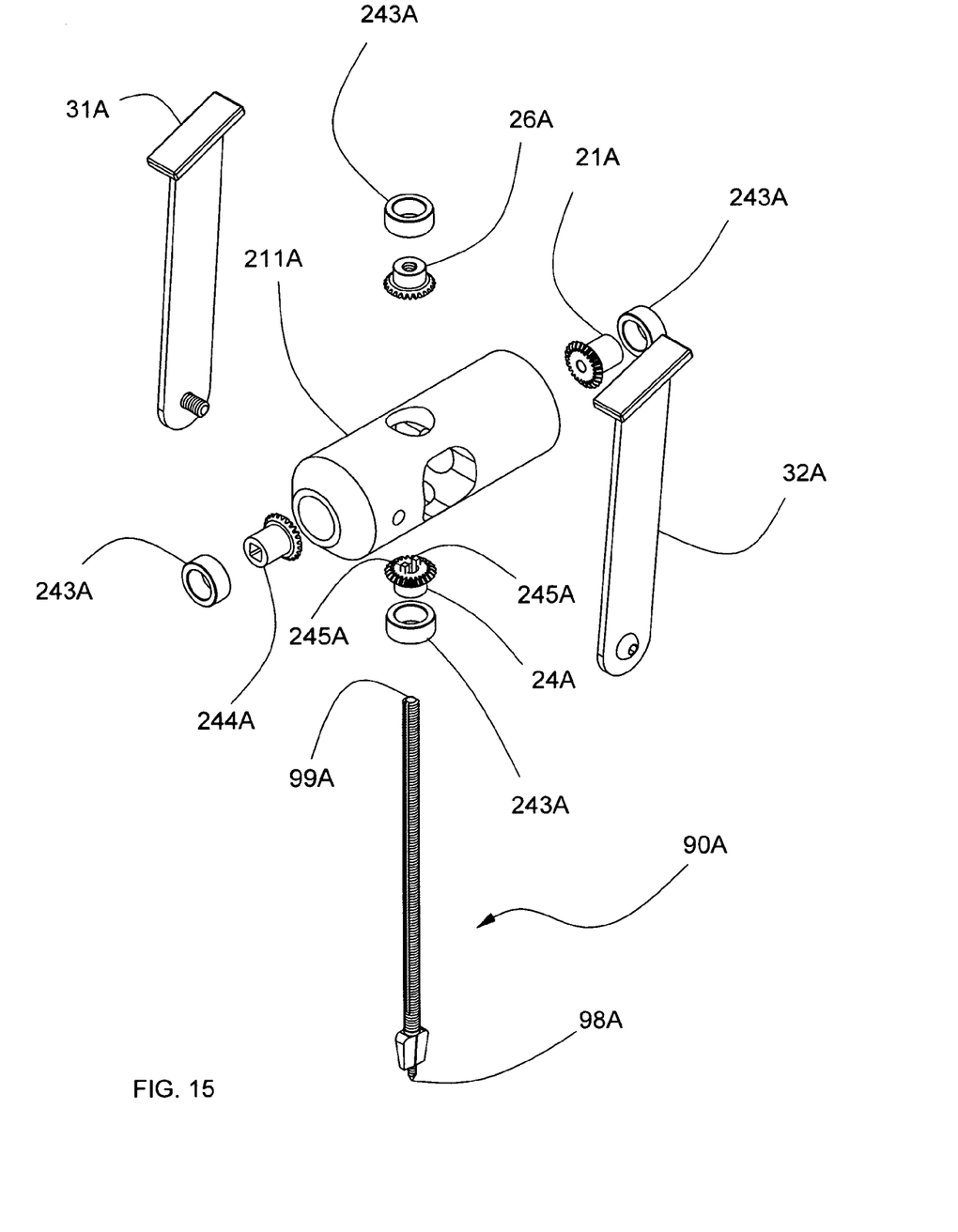
FIG. 15 is an exploded view of the embodiment of FIG. 13.
Figure 19:
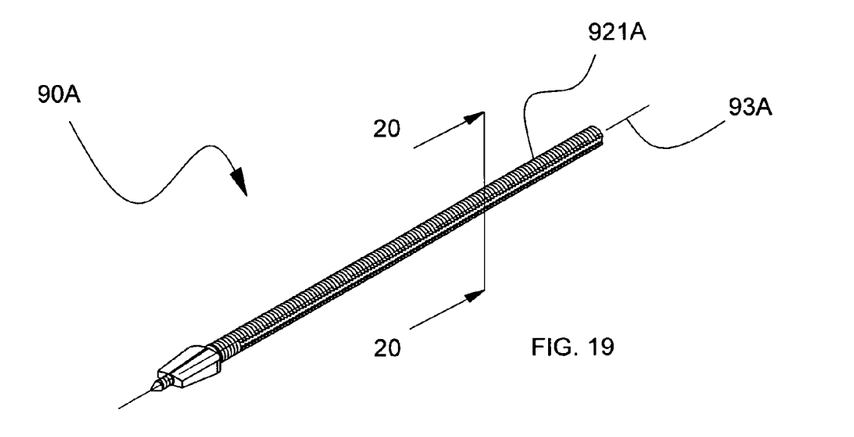
FIG. 19 is an isometric view of a drilling implement.
Figure 20:
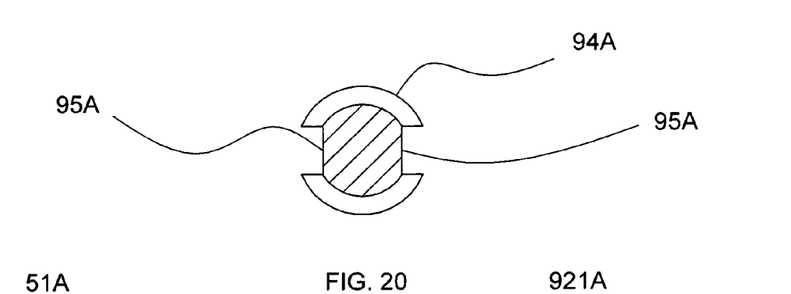
FIG. 20 is a section view across line 20-20.

As shown in FIGS. 15, 19, and 20, the drilling implement 90A can have a cutting end 98A and a tail end 99A, and a shank 921A connecting the cutting end 98A and the tail end 99A. The drilling implement can have a drill axis 93A extending substantially centrally through the shank 921A and through the cutting end 98A and the tail end 99A.

The drilling implement 90A can comprise external threads 94A residing along the shank 921A and extending along the shank 921A coaxially to the drill axis 93A. Additionally the drilling implement 90A can have an elongate groove 95A extending along the shank 921A parallel to the drill axis 93A and interrupting at least some of the external threads 94A long the shank 921A. The drive assembly 20A can cause the drilling implement 90A to rotate and translate toward the workpiece, and the drive assembly 20A can cause the drilling implement 90A to rotate reversely and translate toward the opposite surface.

The drilling implement can have more than one elongate groove and the grooves can be positioned along the shank at different angular positions about the drill axis 93A.

The drive assembly 20A can comprise various gears mounted for rotation to the frame 211A.

The drive assembly 20A can comprise a translation gear 26A having a threaded bore. The translation gear 26A can engage external threads 94A along the drilling implement 90A via the threaded bore so that counter-rotating the drilling implement 90A with respect to the translation gear 26A causes relative translation along the drill axis 93A between the translation gear 26A and the drilling implement 90A.

The drive assembly 20A can comprise a rotation gear 24A having a clearance bore, where the clearance bore is sized to enable the drilling implement shank 921A to translate sliding through the clearance bore along the drill axis 93A.

The rotation gear 24A can have a projection extending radially into the clearance bore to engage the elongate groove 95A. In the drive assembly 20A, the projection is a rectangular key 245A. The rotation gear 24A comprises a key seat formed on the clearance bore and the rectangular key 245A can be positioned in the key seat to extend into the clearance bore and engage the elongate groove 95A. With the rectangular key 245A engaged with the elongate groove 95A, the drilling implement 90A can translate along the drill axis 93A with respect to the rotation gear 24A while co-rotating with the rotation gear 24A.

The rotation gear 24A can comprise more than one projection and the projections can correspond to elongate grooves positioned along the shank at different angular positions about the drill axis 93A.

The translation gear 26A and the rotation gear 24A can be positioned with the respective bores coaxially aligned with each other and with the drill axis 93A.

Additionally, the drive assembly 20A can comprise a drive gear 21A. The drive gear 21A can operatively engage the translation gear 26A and the rotation gear 24A simultaneously so that rotating the drive gear 21A causes the translation gear 26A and the rotation gear 24A to counter-rotate with respect to each other. The drive gear 21A, in use, can cause substantially synchronized drilling implement rotation via the rotation gear 24A and drilling implement translation via the translation gear 26A.

The drive assembly 20A can comprise an idler gear 244A. The idler gear 244A can be positioned opposite the drive gear and can engage the rotation gear 24A and the translation gear 26A. The idler gear 244A can be useful to balance loads on the rotation gear, the translation gear, and the drive gear. Additionally, the idler gear 244A can be utilized to drive additional components.

The drive assembly 20A can comprise a ball bearing 243A for rotatingly mounting gears to the drive assembly.

Figure 16:
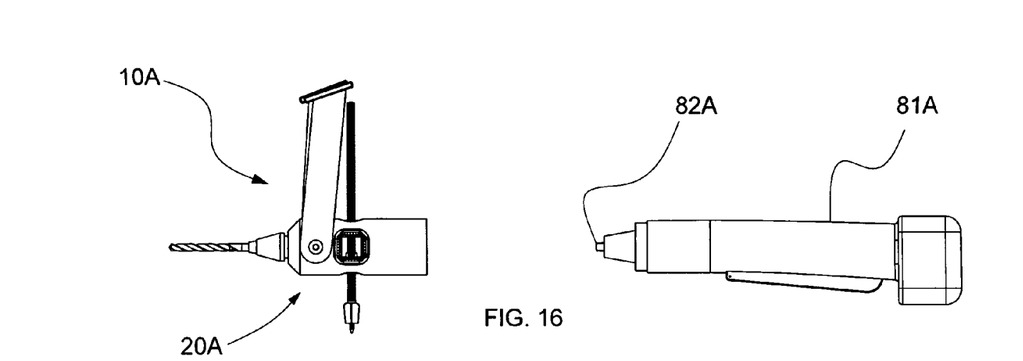
FIG. 16 is a side view of the embodiment of FIG. 13.
Figure 17:
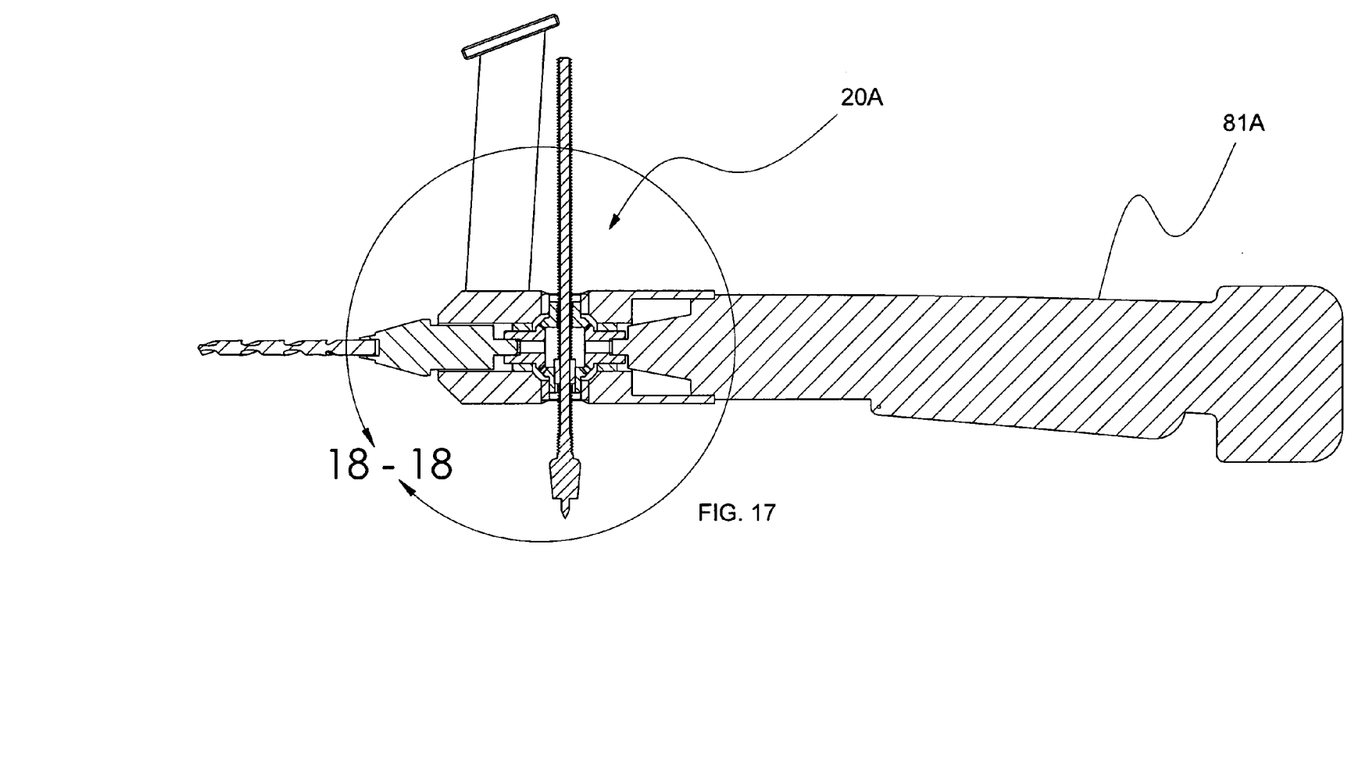
FIG. 17 is a side section view of the embodiment of FIG. 13 connected to a cordless drill.
Figure 18:
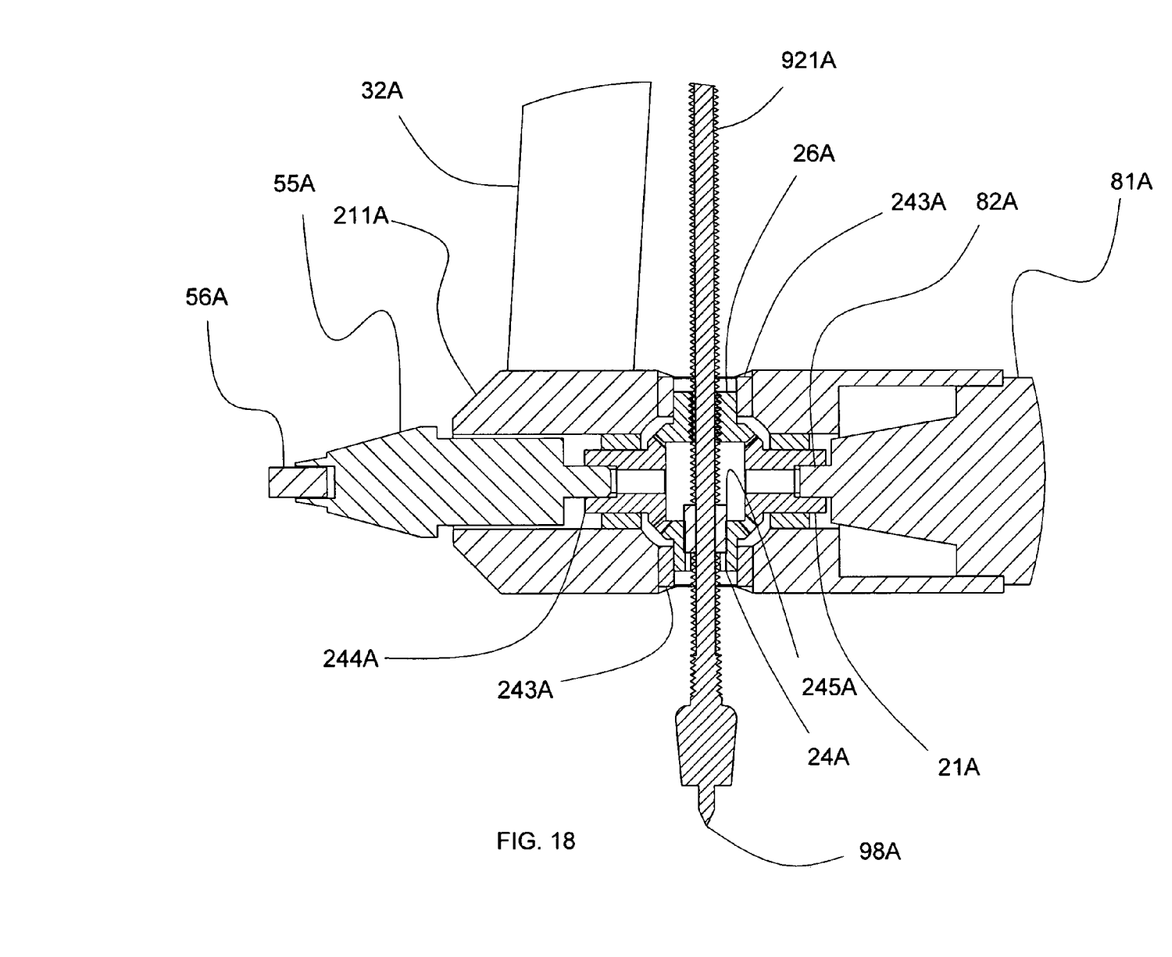
FIG. 18 is a detail view from within line 18-18.

As shown in FIGS. 16, 17, and 18 the product 10A can comprise additional components, for example the chuck 55A. The chuck 55A can engage the idler gear 244A and co-rotate with the idler gear 244A.

The product 10A can comprise a twist drill 56A mounted in the chuck 55A and utilized for conventional drilling in unconfined spaces.

Figure 21:
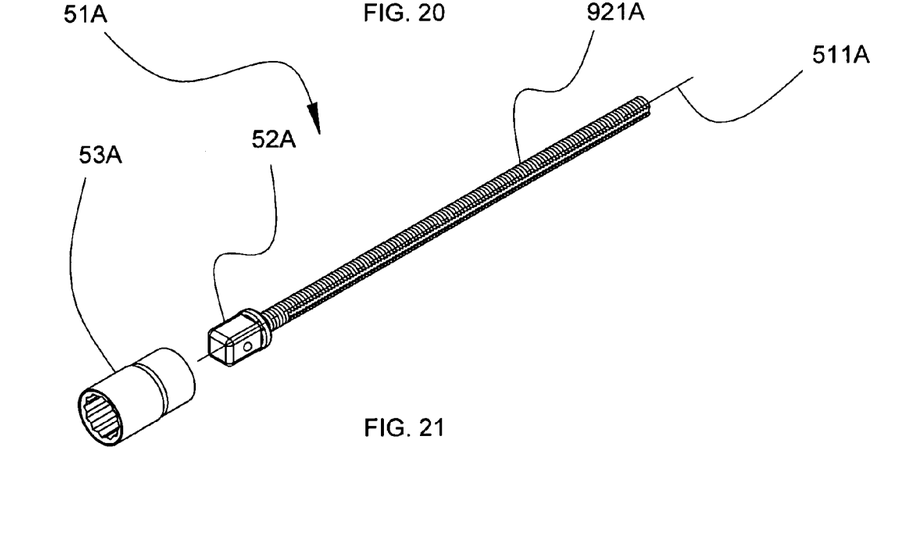
FIG. 21 is an isometric view of a nut driver and socket.

As shown in FIG. 21, the product 10A can further comprise a nut driver 51A. Similar to the drilling implements 90 and 90A, the nut driver can comprise external threads 94A residing along the shank 921A and coaxial to a nut driver axis 511A. Additionally the nut driver 51A can have an elongate groove 95A extending along the shank 921A and interrupting at least some of the external threads 94A along the shank 921A. The nut driver 51A can have a male end 52A and can drive a socket 53A for use with threaded fasteners and other components.

The nut driver 51A can have more than one elongate groove and the grooves can be positioned along the shank at different angular positions about the nut driver axis 511A.

The drive assembly 20A can engage the nut driver 51A via the rotation gear 24A and the translation gear 26A to cause synchronous nut driver rotation and translation.

As shown in FIGS. 13, 14, and 15, the product 10A can further comprise a brace. The brace can limit drilling product movement away from the workpiece while drilling the workpiece. The brace can connect to the frame 211A and can contact the opposite surface so that the brace can be squeezed between the frame 211A and the opposite surface. The drilling product 10A can comprise more than one brace.

The brace can be adjustable to accommodate various distances between the frame 211A and the opposite surface. The brace can be adjustable by pivoting. The brace can be adjustable by telescoping. The brace can be adjustable via various adjusting modes including pivoting, telescoping, and combinations thereof.

The drilling product 10A has a brace comprising a leg 32A pivotally connected to the frame 211A. The leg 32A can have a pad 31A distal the frame 10A and the leg 32A can pivot to bring the pad 31A into contact with the opposite surface. The brace can have more than one leg. The leg can have more than one pad.

The pad 31A can be pivotally connected to the leg 32A. The pad 31A can comprise material with friction characteristics that minimize slipping between the pad 31A and the opposite surface.

The invention claimed is:
1. A tight-space drilling product comprising:
a drilling implement in use positioned in a confined space between a workpiece and an overhanging opposite surface;
the drilling implement having a confined drilling configuration;
the drilling implement in the confined drilling configuration drilling into the workpiece;
the drilling implement comprising a cutting end, a distal tail end, and a shank connecting the cutting end and the tail end;
the drilling implement further comprising a drill axis extending substantially centrally through the shank and through the cutting end and the tail end;
the cutting end in the confined drilling configuration contacting the workpiece;
the tail end in the confined drilling configuration contacting the opposite surface;

where the drilling implement drills by rotating about the drill axis while translating along the drill axis towards the workpiece;
the drilling product further comprising a drive assembly operatively engaging the drilling implement between the cutting end and the tail end; and
the drive assembly in use causing the drilling implement to rotate about the drill axis and synchronously causing the drilling implement to translate along the drill axis.

2. The drilling product of claim 1 wherein the drilling implement further comprises:
an unconfined drilling configuration between a workpiece and an overhanging opposite surface;
a drilling implement in the unconfined drilling configuration drilling into the workpiece;
where the cutting end in the unconfined drilling configuration contacts the workpiece; and
where the tail end in the unconfined drilling configuration is proximal the opposite surface.

3. The drilling product of claim 1 wherein the drive assembly comprises a workpiece side and an opposite side; and wherein the drilling implement in use extends beyond the workpiece side away from the opposite side and extends beyond the opposite side away from the workpiece side.

4. The drilling product of claim 1 wherein the workpiece comprises a drilled surface; and wherein the drilling implement drills into the workpiece substantially orthogonally through the drilled surface.

5. The drilling product of claim 3 wherein the shank comprises:
external threads residing along the shank and being coaxial to the drill axis;
an elongate groove extending along the shank parallel to the drill axis and interrupting at least some of the external threads along the shank;
the drive assembly further comprising:
a translation gear having a threaded bore;
the translation gear in use threadedly engaging the external threads via the threaded bore;
a rotation gear having a clearance bore therethrough including a projection extending radially into the clearance bore;
the rotation gear in use co-rotating with the drilling implement via the projection engaging the elongate groove;
a drive gear in use operatively engaging the translation gear and the rotation gear and causing the translation gear and the rotation gear to counter-rotate with respect to each other; and
the drive gear in use causing drilling implement rotation via the rotation gear and causing drilling implement translation via the translation gear.

6. The drilling product of claim 5 wherein the drive assembly further comprises:
the drive gear in use rotating about a drive axis; and
the drive axis being non-parallel to the drill axis.

7. The drilling product of claim 6 wherein the drive axis is positioned at an oblique angle with respect to the drill axis.

8. The drilling product of claim 6 wherein the drive axis is positioned perpendicularly with respect to the drill axis.

9. The drilling product of claim 5 wherein the translation gear and the rotation gear in use are positioned with the respective bores aligned coaxially to each other and to the drill axis.

10. A tight-space drilling product comprising:
a drilling implement capable of drilling orthogonally into a workpiece from a confined drilling position between the workpiece and an overhanging opposite surface;
the drilling implement having a cutting end, a distal tail end, and a shank connecting the cutting end and the tail end;
the drilling implement having a drill axis extending substantially centrally through the shank between the cutting end and the tail end;
the cutting end in the confined drilling position contacting the workpiece;
the tail end in the confined drilling position can contacting the opposite surface; and
the drilling implement drilling by rotating about the drill axis while translating along the drill axis towards the workpiece;
the drilling product further comprising a drive assembly connected to the drilling implement,
the drive assembly operatively engaging the drilling implement between the cutting end and the tail end; and
the drive assembly in use causing the drilling implement to rotate about the drill axis and causing drilling implement to translate along the drill axis.

11. The drilling product of claim 10 wherein the drive assembly comprises a workpiece side and an opposite side; and wherein the drilling implement in use extends beyond the workpiece side away from the opposite side and extends beyond the opposite side away from the workpiece side.

12. The drilling product of claim 11 wherein the shank comprises:
external threads residing along the shank and being coaxial to the drill axis;
an elongate groove extending along the shank parallel to the drill axis and interrupting at least some of the external threads along the shank;
the drive assembly further comprising:
a translation gear having a threaded bore;
the translation gear in use threadedly engaging the external threads via the threaded bore;
a rotation gear having a clearance bore therethrough including a projection extending radially into the clearance bore;
the rotation gear in use co-rotating with the drilling implement via the projection engaging the elongate groove;
a drive gear in use operatively engaging the translation gear and the rotation gear and causing the translation gear and the rotation gear to counter-rotate with respect to each other; and
the drive gear in use causing drilling implement rotation via the rotation gear and causing drilling implement translation via the translation gear.

13. The drilling product of claim 12 wherein the drive assembly further comprises:
the drive gear in use rotating about a drive axis; and
the drive axis being non-parallel to the drill axis.

14. The drilling product of claim 13 wherein the drive axis is positioned at an oblique angle with respect to the drill axis.

15. The drilling product of claim 12 wherein the drive axis is perpendicular to the drill axis.

16. The drilling product of claim 11 wherein the translation gear and the rotation gear in use are positioned with respective bores aligned coaxially to each other and to the drill axis.

17. A tight-space drilling product comprising:
a drilling implement having a confined drilling configuration between a workpiece and an overhanging opposite surface, the drilling implement comprising:
a cutting end, a tail end, and a shank separating the cutting end and the tail end;
the cutting end in the confined drilling configuration contacting the workpiece;

the tail end in the confined drilling configuration contacting the opposite surface;

the drilling implement having a drill axis extending along the shank and passing through the cutting end and the tail end;

the drilling implement in use rotating about the drill axis and translating along the drill axis;

the shank having external threads extending along the drill axis between the cutting end and the tail end;

the shank having an elongate groove interrupting at least some of the external threads along the drill axis between the cutting end and the tail end;

the shank having an unthreaded portion medial the threads and the tail end;

the drilling product further comprising a drive assembly operatively engaging the drilling implement between the cutting end and the tail end;

the drive assembly in use causing the drilling implement to rotate about the drilling axis and causing the bit to translate along the drilling axis;

the drive assembly comprising:

a frame comprising a drive side, a workpiece side, and an opposite side;

the drilling implement in use extending beyond the workpiece side away from the opposite side and extending beyond the opposite side away from the workpiece side;

a translation gear rotatably connected to the frame, the translation gear having a threaded bore;

the translation gear in use threadedly engaging the external threads via the threaded bore;

a rotation gear rotatably mounted to the frame, the rotation gear having a clearance bore with a pin extending radially into the clearance bore;

the rotation gear in use co-rotating with the drilling implement via the pin engaging the elongate groove;

a drive gear in use rotating about a drive axis;

the drive gear in use operatively engaging the threaded gear and the rotation gear and causing the threaded gear and the rotation gear to counter-rotate with respect to each other;

the rotating drive gear causing drilling implement rotation via the rotation gear and causing drilling implement translation via the threaded gear; and the drilling implement further comprising a return component acting between the drilling implement and the drive assembly;

the return component pressing at least one external thread against the threaded bore when the unthreaded portion is within the threaded bore.

18. The drilling product of claim 17 wherein the return component comprises: a biasing element acting between the tail end and the opposite side.

19. The drilling product of claim 18 wherein the biasing element comprises a spring.

* * * * *